United States Patent [19]

Mertens et al.

[11] Patent Number: 5,582,383
[45] Date of Patent: Dec. 10, 1996

[54] INTERIOR REARVIEW MIRROR FOR VEHICLES

[75] Inventors: Jens Mertens, Hochdorf/Enz; Klaus Weller, Ebersbach, both of Germany

[73] Assignee: Reitter & Schefenacker GmbH & Co. KG, Esslingen, Germany

[21] Appl. No.: 450,504

[22] Filed: May 26, 1995

[30] Foreign Application Priority Data

May 26, 1994 [DE] Germany ............................ 44 18 357.7

[51] Int. Cl.[6] ................................................ A47G 1/24
[52] U.S. Cl. ................................ 248/484; 359/872
[58] Field of Search ........................... 248/481, 475.1, 248/476, 479, 483, 484; 359/872, 873

[56] References Cited

U.S. PATENT DOCUMENTS 4,624,539  11/1986  King et al. .................... 248/484 X
4,645,316  2/1987  Ohyama ........................ 248/481
5,151,828  9/1992  Sugimura .................... 248/481 X
5,412,511  5/1995  Beinhauer ................... 248/481 X

*Primary Examiner*—Ramon O. Ramirez
*Attorney, Agent, or Firm*—Robert W. Becker & Associates

[57] ABSTRACT

An interior rearview mirror for a vehicle. The mirror includes a mirror bracket that by means of a ball-and-socket joint carries a mirror housing that is provided with a mirror glass mounted on a glass carrier that together with the housing can be shifted between a first position and a second position by a knob. The glass carrier is pivotably connected to a support, and a swivel plate is fixedly connected to the knob. A guide pin is disposed on the swivel plate and engages a guide of the support for interconnecting the support and the swivel plate. A stop is disposed on the swivel plate and in one of the positions of the glass carrier rests against the outer surface of the guide.

12 Claims, 3 Drawing Sheets

Fig.4
Fig.5
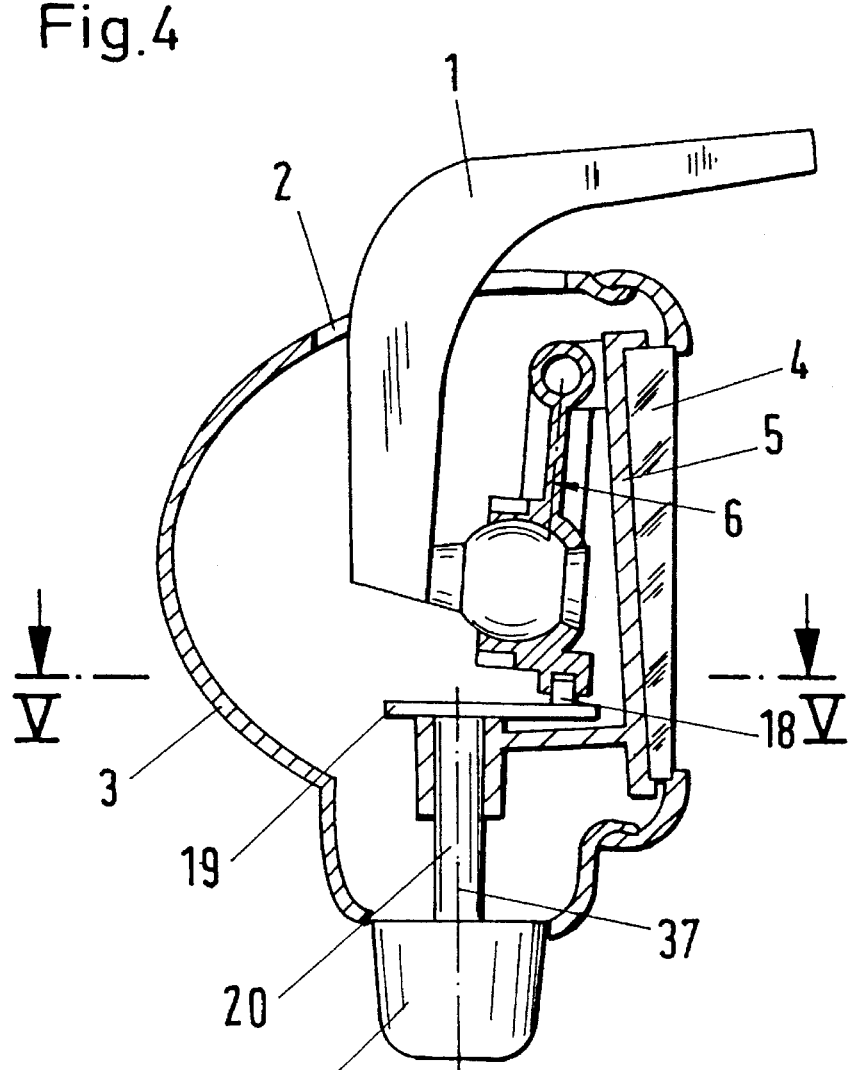
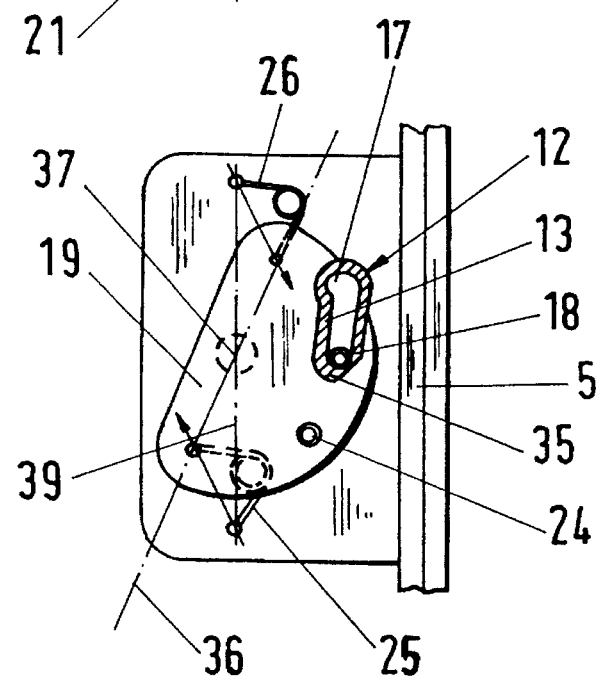

5,582,383

INTERIOR REARVIEW MIRROR FOR VEHICLES

BACKGROUND OF THE INVENTION

The present invention relates to an interior rearview mirror for a vehicle, and includes a mirror bracket that by means of a ball-and-socket joint carries a mirror housing that is provided with a mirror glass mounted on a glass carrier that together with the mirror housing can be shifted between a first position, such as a daytime position, and a second position, such as a nighttime position, by means of a knob. The glass carrier is pivotably connected to a support means that is connected by means of a guide means to a swivel means that is fixedly connected to the knob.

In a known rearview mirror of this type (DE-GM 91 01 986), the swivel means is provided with a guide slot that is engaged by a guide member of the support means. The knob turns the swivel means, whereby the mirror housing, along with the mirror glass, is pivoted by the guide part out of one position and into the other position. In both positions, the guide part is disposed under spring force at the end of the guide slot. With this known rearview mirror, the danger exists that at least in one of the positions the mirror housing can unintentionally be pivoted back into the other position, for example as a consequence of vibrations.

It is therefore an object of the present invention to improve an interior rearview mirror of the above-mentioned general type in such a way that with a straightforward construction, a trouble free and reliable shifting of the mirror glass is made possible, and that the mirror glass is satisfactorily held in either position.

BRIEF DESCRIPTION OF THE DRAWINGS

This object, and other objects and advantages of the present invention, will appear more clearly from the following specification in conjunction with the accompanying schematic drawings, in which:

FIG. 4 is a view similar to that of FIG. 2 in the non-glare position; and

FIG. 5 is a cross-sectional view taken along the line V—V in FIG. 4.

SUMMARY OF THE INVENTION

Figure 1:
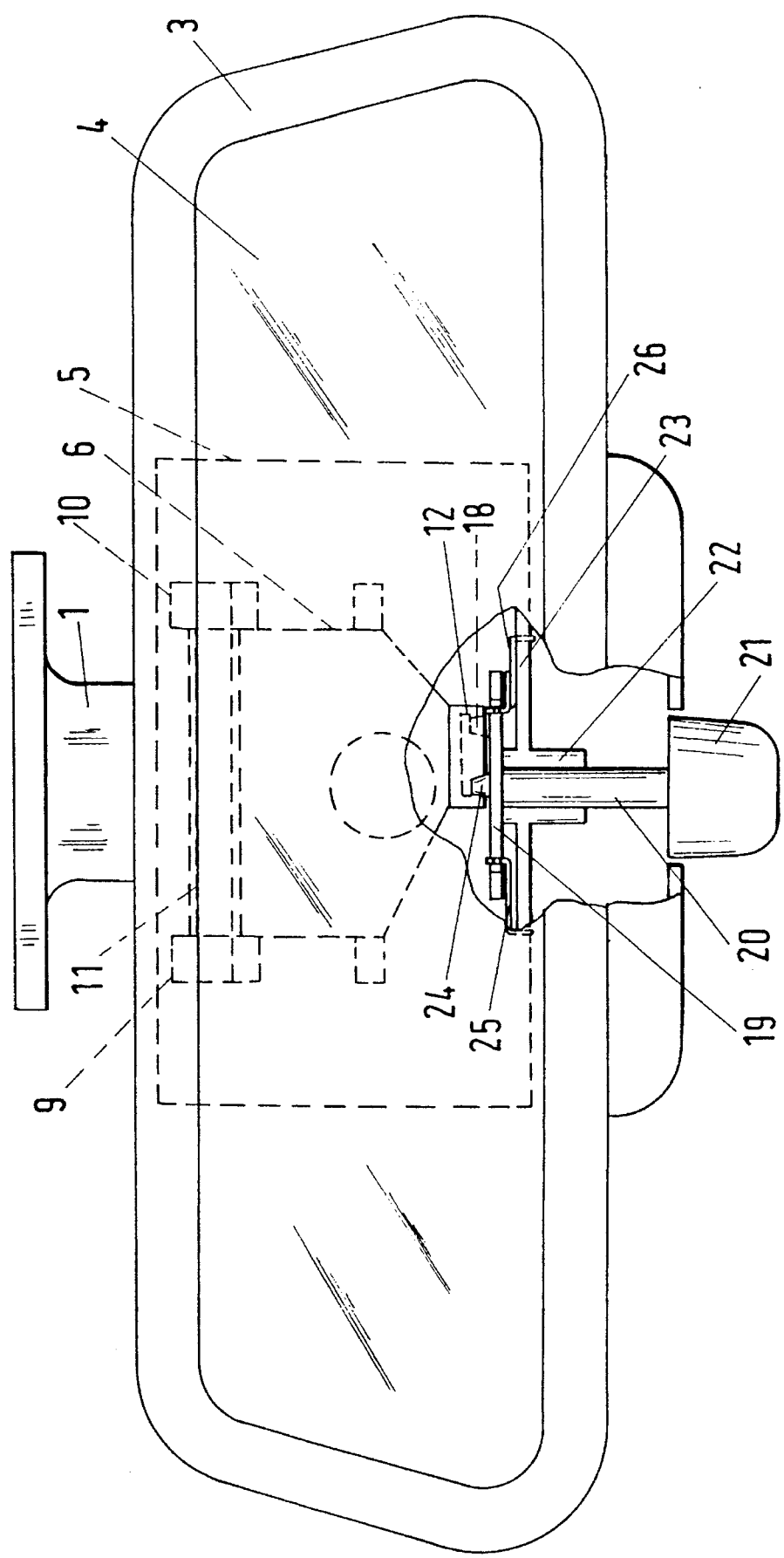
FIG 1. is a partially broken away front view of one exemplary embodiment of the inventive interior rearview mirror.

The interior rearview mirror of the present invention is characterized primarily in that the swivel means is provided with a guide pin that engages a guide means that is provided on the support means, and in that the swivel means is also provided with a stop means that in one of the positions of the glass carrier rests against the outer surface of the guide means.

With the inventive interior rearview mirror, the support means is provided with the guide means for the guide pin of the swivel means. By turning the knob, the swivel means is turned, whereby by means of the guide pin that engages the guide means, the glass carrier, and hence the mirror glass and the housing, are pivoted into the respective position relative to the support means and hence to the mirror bracket. In one position of the glass carrier, the stop means rests against the outer surface of the guide means. This reliably prevents the mirror glass from unintentionally pivoting into the other position.

Further specific features of the present invention will be described in detail subsequently.

DESCRIPTION OF PREFERRED EMBODIMENTS

Referring now to the drawings in detail, the illustrated interior rearview mirror is provided for motor vehicles and is embodied as an inside mirror. The mirror has a support or bracket 1 via which the interior rearview mirror is mounted to the motor vehicle in a known manner. The mirror bracket 1 projects through an opening 2 into a mirror housing 3, with a wedge-shaped mirror glass 4 being provided on that side of the mirror housing 3 that faces the driver. The mirror glass 4 is mounted on a glass carrier 5 that is disposed within the mirror housing 3 and is connected to a shift plate 6. The shift plate has a joint socket 7 via which it is seated on a ball end 8 which is provided on the free end of the mirror bracket 1 within the mirror housing 3. By means of this ball-and-socket joint 7, 8, the mirror housing 3, and hence the mirror glass 4, can be shifted into the desired position relative to the driver of the motor vehicle.

Projecting out at right angles from the back side of the glass carrier 5 are two brackets 9 and 10 (FIG. 1) which are engaged by the ends of a shaft 11 of the shift plate 6. As a consequence, the glass carrier 5 with its mirror glass 4 can be pivoted relative to the shift plate 6 in a manner to be described subsequently.

Figure 3:
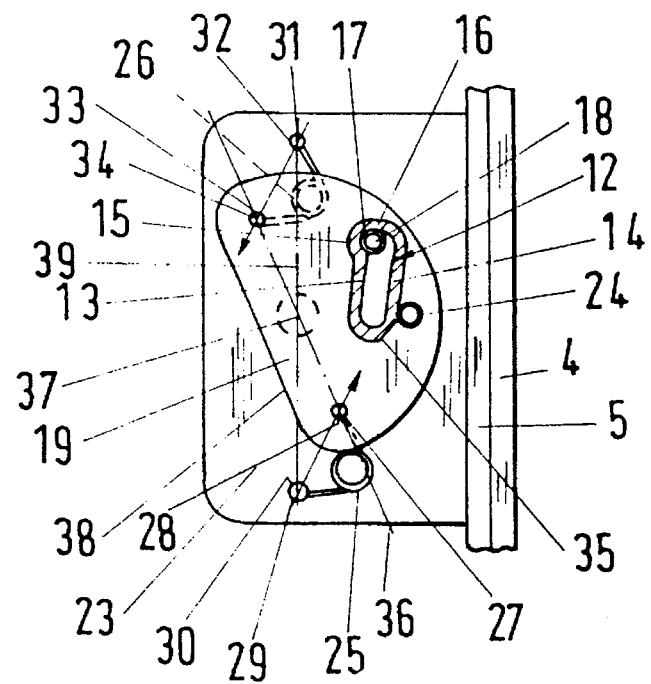
FIG. 3 is a cross-sectional view taken along the line III—III in FIG. 2.

That side of the shift plate 6 remote from the shaft 11 is provided with a connecting member guide means 12 that is preferably integral with the shift plate. As illustrated in FIG. 3, the guide means 12 has a nearly oval shape. In addition, the connecting member guide means 12 has side or wall portions 13 and 14 that extend parallel to one another and that merge with one another at one end in the manner of part of a circle. At the other end, the side portion 13 has an intermediate side portion 15 that diverges from the side or wall portion 14 and in turn merges with an end portion 16 that is curved in the manner of part of a circle and connects the intermediate side potion 15 to the side portion 14, which is linear over its entire length. Due to the presence of the intermediate side portion 15, the connecting member guide means 12 has an arresting seat 17 for a guide pin 18 that is provided on a swivel plate 19. This swivel plate is disposed on the upper end of a shaft 20, within the mirror housing 3, while a rotary knob 21 is disposed at the lower end of the shaft, outside of the mirror housing where it is exposed. The swivel plate 19 and the shaft 20, or the shaft 20 and the rotary head 21, are advantageously one piece. The swivel plate 19 can be easily turned by the knob 21 for adjusting the glass carrier 5.

A portion of the shaft 20 is guided in a sleeve 22 that is connected to the glass carrier 5 by means of a transverse member 23. The sleeve 22, the transverse member 23 and the glass carrier 5 are advantageously all one piece.

The rotary knob 21 is rotatably mounted in the mirror housing 3 by means of the shaft 20 and the sleeve 22. As can be seen from FIG. 3, the transverse member 23 has a rectangular shape and projects at right angles from the back side of the glass carrier plate 5. The swivel plate 19 has a shape of approximately half of a circle and is provided on that side that faces the connecting member guide means 12 with the guide pin 18 as well as with a stop pin 24. Both of the pins project at right angles from that side of the swivel plate 19 that is remote from the shaft 20.

The side sections 13 to 16 of the connecting member guide means 12 project at right angles from the underside of the shift plate 6 and form a continuous wall that is advantageously integrally formed with the shift plate 6. At least the guide pin 18 has the shape of a truncated cone that tapers in a direction toward its free end. A satisfactory engagement of the guide pin 18 in the connecting member guide means 12 is thus ensured if the guide means are disposed at an angle to the swivel plate 19 (FIGS. 2 and 4).

Two leg springs 25 and 26 engage the swivel plate 19 at opposite locations (FIGS. 1 and 3). As can be seen from FIG. 1, the leg springs 25, 26 are disposed in a region between the transverse member 23 of the glass carrier 5, and the swivel plate 19. One angled-off end 27 of the leg spring 25 is disposed in an opening 28 of the swivel plate 19, while the other angled-off end 29 of the spring is disposed in an opening 30 of the transverse member 23. In a similar manner, the angled-off end 31 of the leg spring 26 is disposed in an opening 32 of the transverse member 23 while the angled-off end 33 of the spring is disposed in an opening 34 of the swivel plate 19.

Figure 2:
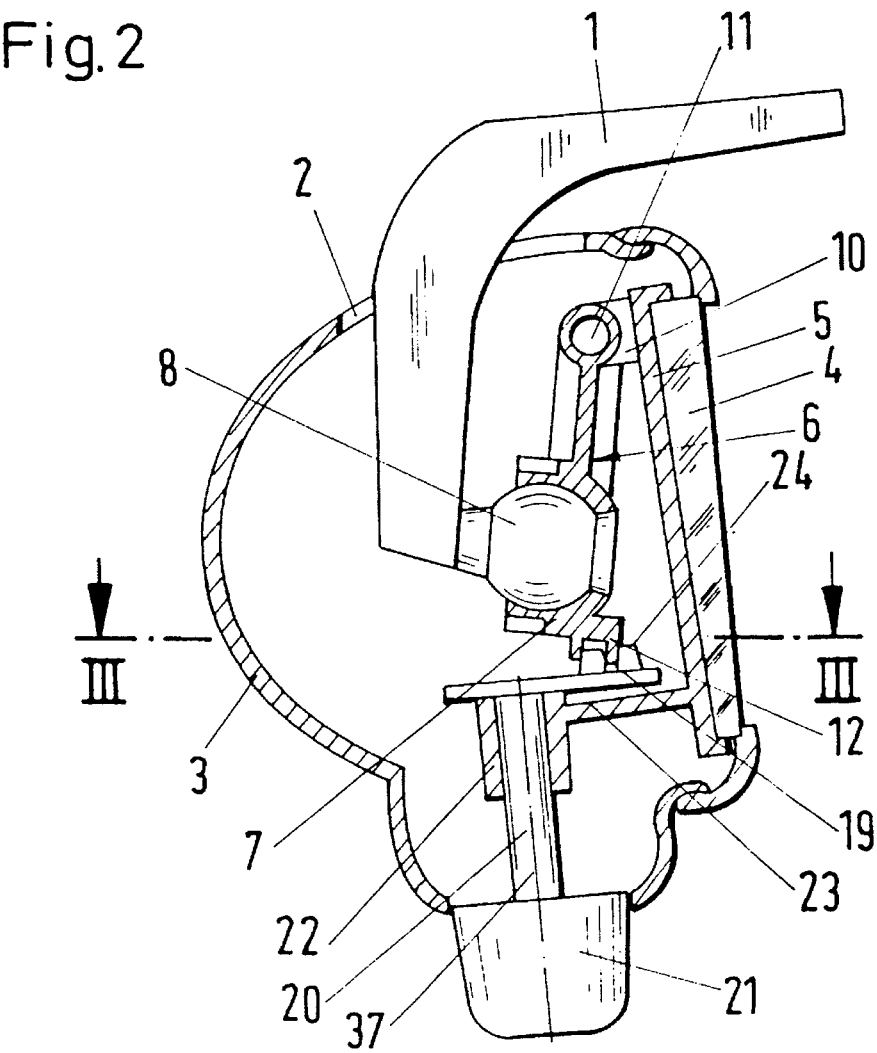
FIG. 2 is a cross-sectional view through the rearview mirror of FIG. 1.

FIGS. 2 and 3 show the mirror housing 3 with its wedge-shaped mirror glass 4 in a first position relative to the shift plate 6. This position is, for example, the daytime position of the interior rearview mirror. In this position, the guide pin 18 is disposed in the arresting seat 17 of the connecting member guide means 12 (FIG. 3). The stop pin 18 rests against the outer side of the side or wall portion 14 where the latter merges into the curved connecting portion 35 of the guide means 12. As a result, the mirror housing 3 is properly kept from shifting over from the position of FIG. 2 into the pivot position of FIG. 4. The swivel plate 19 is under the force of the two leg springs 25, 26, which bias the swivel plate in such a way that the guide pin 18 and the stop pin 24 are pressed against the connecting member guide means 12. The line 36 that connects the axes of the hook-in openings 28, 34 of the swivel plate 19 (FIG. 3) forms a working or effective line of the two leg springs 25, 26. The working line 36 extends through the axis 37 of the shaft 20. As shown in FIG. 3, the working line 36 is parallel to the straight edge 38 of the swivel plate 19 and is also disposed at an acute angle to the side or wall portion 13 of the connecting member guide means 12, i.e. to the pivot axis or shaft 11 of the glass carrier 5, when viewed in the direction of the axis 37 of the shaft 20. This angle opens in the direction toward the leg spring 26. In this position of the mirror housing 3, the shaft 20 of the rotary knob 21 is angled in a direction toward the driver of the motor vehicle (FIG. 2). In addition, the working line 36 is disposed on one side of a straight line 39 that connects the hook-in openings 30, 32 of the transverse member 23 (FIG. 3).

By means of the rotary knob 21, the mirror housing 3, with its mirror glass 4, can be shifted into a second position, for example the nighttime or non-glare position (FIGS. 4 and 5). To accomplish this, the rotary knob 21 is turned in such a way that the guide pin 18 in the connecting member guide means 12 is released from the arresting seat 17 and reaches the position illustrated in FIG. 5, where the guide pin 18 rests against the curved connecting portion 35 of the guide means 12. The leg springs 25 and 26 ensure that the swivel plate 19 is also secured in this position by spring force. In this second position, the working line 36 also extends at an acute angle relative to the wall portion 13 of the connecting member guide means 12, although now the angle opens in the direction toward the leg spring 25. In addition, the working line 36 is disposed on the other side of the straight line 39 (FIG. 5). The stop pin 24 is now disposed at a distance from the connecting member guide means 12. With this rotational movement of the swivel plate 19, when viewed from above onto the swivel plate the guide pin 18 is moved in a clockwise direction within the stationary guide means 12. Since the wall portions 13 and 14 of the connecting member guide means 12 extend parallel to one another and form with the back side of the glass carrier 5, i.e. with the pivot shaft 11 thereof, an acute angle that opens in the direction toward the leg spring, when viewed onto the swivel plate 19, i.e. in the direction of the axis of rotation 37, and since the guide pin 18 carries out a circular movement about the axis 37 of the shaft 20, the glass carrier 5 is pivoted in a direction toward the shift plate 6. Since the mirror glass 4 is fixedly connected to the housing 3, the mirror housing is pivoted by the same amount relative to the mirror bracket 1, which along with the shift plate 6 is stationary. As a consequence of the pivoting movement of the mirror housing 3, the shaft 20 is brought into a vertical position during its rotational movement (FIG. 4). As a result of this rotational movement, the mirror housing 3, together with the glass carrier 5 and the mirror glass 4, are pivoted relative to the shift plate 6 and to the mirror bracket 1. The opening 2 in the mirror housing 3 is large enough to allow not only the described shifting of the mirror housing via the rotary knob 21 but also an adjustment of the interior rearview mirror by the driver.

The shift plate 6 is seated sufficiently securely on the ball end 8 of the mirror bracket 1 so that pivoting of the mirror housing 3 does not alter the position of the shift plate. Thus, when the rotary knob 21 is turned back, the mirror housing returns to its starting position. Since the glass carrier 5 is pivotably connected to the shift plate 6 by means of the brackets 9, 10 and the shaft 11, the mirror housing 3 can be very easily shifted between the two positions.

Depending upon the position of the shift plate 6 on the ball end 8, the connecting member guide means 12 can be disposed at an incline or even horizontally.

By means of the rotary knob 21, the interior rearview mirror can be easily and rapidly shifted between a daytime position and a nighttime or nonglare position. In both positions, the leg springs 25, 26 exert such a force upon the guide pin 18 that not only in the arresting seat 17 of the guide means but also at the connecting portion 35 the guide pin 18 is always under pressure and is firmly pressed against the pertaining wall portion of the guide means 12. The adjustment or shifting means is structurally straightforward yet permits a precise and rapid shifting of the mirror housing 3. Assembly of the interior rearview mirror can be carried out in an effortless manner.

The present invention is, of course, in no way restricted to the specific disclosure of the specification and drawings, but also encompasses any modifications within the scope of the appended claims.

What we claim is:

1. An interior rearview mirror for a vehicle, including a mirror bracket that by means of a ball-and-socket joint carries a mirror housing that is provided with a mirror glass mounted on a glass carrier that together with said mirror housing can be shifted between a first position and a second position by means of a knob, said mirror further comprising:

a support means to which said glass carrier is pivotably connected;

a swivel means that is fixedly connected to said knob;

a guide means disposed on said support means;

a guide pin that is disposed on said swivel means and engages said guide means of said support means for interconnecting said support means and said swivel means; and a stop means that is disposed on said swivel means and that in one of said positions of said glass carrier rests against an outer surface of said guide means.

2. An interior rearview mirror according to claim 1, wherein said support means is mounted on said mirror bracket by means of a ball-and-socket joint.

3. An interior rearview mirror according to claim 1, wherein said guide means is formed by a continuous wall that projects from said support means.

4. An interior rearview mirror according to claim 3, wherein said guide means is provided with an arresting seat for receiving said guide pin in said one position of said glass carrier.

5. An interior rearview mirror according to claim 4, wherein said swivel means is loaded in at least one of said positions in such a way that said guide pin is pressed against said guide means.

6. An interior rearview mirror according to claim 5, wherein opposite sides of said swivel means, relative to an axis of rotation thereof, are engaged by a respective spring means.

7. An interior rearview mirror according to claim 6, wherein each of said spring means is a leg spring.

8. An interior rearview mirror according to claim 6, wherein said spring means is connected to said glass carrier.

9. An interior rearview mirror according to claim 8, wherein said glass carrier is provided on a side thereof remote from said mirror glass with a member that projects therefrom, and wherein said spring means are connected to said member.

10. An interior rearview mirror according to claim 6, wherein said guide means, when viewed in the direction of said axis of rotation of said swivel means, extends linearly perpendicular to said axis of said rotation.

11. An interior rearview mirror according to claim 10, wherein said guide means, when viewed in the direction of said axis of rotation of said swivel means, extends at an acute angle relative to a pivot axis of said glass carrier.

12. An interior rearview mirror according to claim 11, wherein a straight line extending between the points of engagement of said two spring means on said swivel means forms a working line that in both of said positions of said glass carrier extends at an angle relative to said pivot axis of said glass carrier when viewed in the direction of said axis of rotation of said swivel means.

* * * * *